United States Patent
Agrawal

(10) Patent No.: US 12,316,897 B2
(45) Date of Patent: May 27, 2025

(54) SYSTEM AND METHOD FOR REAL-TIME DELIVERY OF A TARGET CONTENT IN A STREAMING CONTENT

(71) Applicant: Star India Private Limited, Mumbai (IN)

(72) Inventor: Ashutosh Agrawal, Mumbai (IN)

(73) Assignee: STAR INDIA PRIVATE LIMITED, Mumbai (IN)

( * ) Notice: Subject to any disclaimer, the term of this patent is extended or adjusted under 35 U.S.C. 154(b) by 39 days.

(21) Appl. No.: 17/754,784

(22) PCT Filed: Oct. 18, 2020

(86) PCT No.: PCT/IN2020/050892
§ 371 (c)(1),
(2) Date: Apr. 12, 2022

(87) PCT Pub. No.: WO2021/074932
PCT Pub. Date: Apr. 22, 2021

(65) Prior Publication Data
US 2024/0040180 A1    Feb. 1, 2024

(30) Foreign Application Priority Data
Oct. 18, 2019 (IN) .............................. 201921042463

(51) Int. Cl.
*H04N 21/2668* (2011.01)
*H04N 21/234* (2011.01)
(Continued)

(52) U.S. Cl.
CPC ... *H04N 21/2668* (2013.01); *H04N 21/23424* (2013.01); *H04N 21/2393* (2013.01);
(Continued)

(58) Field of Classification Search
CPC ......... H04N 21/2668; H04N 21/23424; H04N 21/2393; H04N 21/25866; H04N 21/812;
(Continued)

(56) References Cited

U.S. PATENT DOCUMENTS 8,060,904 B1    11/2011  Evans et al.
8,495,675 B1     7/2013  Philpott et al.
(Continued)

FOREIGN PATENT DOCUMENTS

CN    101511055 A    8/2009
CN    102346898 A    2/2012
(Continued)

OTHER PUBLICATIONS

International Application Serial No. PCT/IN20/50892, Search Report and Written Opinion dated May 25, 2021, 10 pages.
(Continued)

*Primary Examiner* — Nathan J Flynn
*Assistant Examiner* — Christine A Kurien
(74) *Attorney, Agent, or Firm* — Ladas & Parry, LLP

(57) ABSTRACT

The present disclosure provides methods and systems for real-time delivery of a target content in a streaming content. The method comprising receiving a request for streaming content from at least one user device [102]. The request comprises user segment information associated with the at least one user device. Next, the method comprises dynamically fetching at least one target content for the at least one user device [102] based on the user segment information. Next, the method comprises creating a customized virtual manifest by inserting the at least one target content in the requested streaming content in real-time. Next, the method comprises sending the customized virtual manifest to the at least one user device [102] based on the user segment information. Thereafter, the method comprises delivering
(Continued)

the at least one target content in the requested streaming content to the at least one user device [102] based on the customized virtual manifest.

20 Claims, 6 Drawing Sheets

(51) Int. Cl.
*H04N 21/239* (2011.01)
*H04N 21/258* (2011.01)
*H04N 21/81* (2011.01)
*H04N 21/858* (2011.01)

(52) U.S. Cl.
CPC ..... *H04N 21/25866* (2013.01); *H04N 21/812* (2013.01); *H04N 21/8586* (2013.01)

(58) Field of Classification Search
CPC ............. H04N 21/8586; H04N 21/252; H04N 21/25841; H04N 21/25883; H04N 21/25891; H04N 21/26258; H04N 21/8456

See application file for complete search history.

(56) References Cited

U.S. PATENT DOCUMENTS

| | | | |
|---|---|---|---|
| 8,799,061 B1 | 8/2014 | Chatterjee et al. | |
| 9,491,499 B2 | 11/2016 | Wagenaar et al. | |
| 10,217,138 B1 | 2/2019 | Mills et al. | |
| 10,223,713 B2 | 3/2019 | LaJoie | |
| 2008/0276270 A1 | 11/2008 | Kotaru et al. | |
| 2009/0187463 A1 | 7/2009 | daCosta | |
| 2009/0300675 A1* | 12/2009 | Shkedi ............... | H04N 7/17318 725/34 |
| 2012/0060195 A1* | 3/2012 | Fishman .......... | H04N 21/44204 725/116 |
| 2012/0166289 A1 | 6/2012 | Gadoury et al. | |
| 2013/0124327 A1* | 5/2013 | Doughty ............ | G06Q 30/0267 705/14.64 |
| 2014/0143439 A1* | 5/2014 | Ramamurthy ... | H04N 21/25808 709/231 |
| 2014/0229529 A1* | 8/2014 | Barone ................ | H04L 65/103 709/203 |
| 2015/0026719 A1 | 1/2015 | Menon | |
| 2015/0227977 A1 | 8/2015 | Shottan et al. | |
| 2015/0331583 A1* | 11/2015 | Zhang .................. | G06F 3/0484 715/825 |
| 2016/0142754 A1 | 5/2016 | Kouritzin et al. | |
| 2016/0295263 A1 | 10/2016 | Fix et al. | |
| 2017/0201779 A1* | 7/2017 | Publicover ......... | H04N 21/4532 |

FOREIGN PATENT DOCUMENTS

| | | |
|---|---|---|
| CN | 105939386 A | 9/2016 |
| CN | 114631324 A | 6/2022 |
| DE | 112020004978 | 7/2022 |
| EP | 2622557 B1 * | 9/2011 |
| EP | 2622557 A1 | 8/2013 |
| GB | 2603422 A | 8/2022 |
| JP | 2007233906 A | 9/2007 |
| KR | 101102853 B1 | 1/2012 |
| KR | 20160138044 A | 12/2016 |
| WO | 2021074932 A2 | 4/2021 |
| WO | 2021074932 A3 | 7/2021 |

OTHER PUBLICATIONS

Programmatic Creative vs. Dynamic Creative Optimization (DCO), 2022, Retrieved from the Internet: https://aws.amazon.com/media/tech/what-server-side-ad-insertion-ssai/.
Server-Side Ad Insertion (SSAI), Amazon Web Services 2022; Retrieved from the Internet: https://aws.amazon.com/media/tech/what-server-side-ad-insertion-ssai/.
Chinese Notice of Allowance for Application No. CN2020800725758, dated Nov. 21, 2023, 5 pages.
Muhammad Waqar, Tracking User Activities and Marketplace Dynamics in Classified Ads, IEEE, Jan. 16, 2017, pp. 1-4.
Tian Feng; Ma Xiaoliang; Using data analysis A system that analyzes associated user information and implementation methods, Sep. 25, 2018, pp. 1-5.
Chinese Office Action, dated Aug. 29, 2023, CN Application 2020800725758, 26 pages.
Chinese Search Report, dated Aug. 27, 2023, for CN Application No. 2020800725758, 3 pages.

* cited by examiner

SYSTEM AND METHOD FOR REAL-TIME DELIVERY OF A TARGET CONTENT IN A STREAMING CONTENT

CROSS REFERENCE TO RELATED APPLICATIONS

This application is a national application and, pursuant to 35 U.S.C. § 371, is entitled to and claims the right of priority based on international application no. PCT/IN2020/050892 filed Oct. 18, 2020, which claims priority to Indian Patent Application number 201921042463 filed Oct. 18, 2019, the content of which are incorporated herein by reference in their entirety for all purposes.

TECHNICAL FIELD

The present disclosure generally relates to management of streaming content in a wired and/or wireless communication networks, and more particularly, and not by way of any limitation, to a system and method for real-time delivery of a target content in a streaming content.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the overall field of the present disclosure, and not as admissions of prior art.

Live streaming and advertisement insertion in live streaming media have been known. The current mechanisms or techniques used for inserting advertisement in live streaming content, such as a live video broadcast, over a wired and/or wireless communication network, includes personalized ad insertion. In the known personalized ad insertion techniques, playout operators typically include markers in the live stream, wherein the markers indicate the timestamps where advertisement are to be inserted. While delivering the live stream media to the users, the server inserts personalized advertisements on the fly for each user. Thus, advertisement is curated per the interests of each connected user, and thus for millions of users watching live streaming media at a moment, the processing time for providing such curated advertisement is very high.

In the existing solutions, ad insertion in a live streaming media is done on a per user basis. Since number of concurrent users in a live streaming scenario are very high, of the order of millions, the existing solutions are unable to scale to such large numbers as the entire processing of the ad insertion is done separately for each user. The existing solutions, if at all they are able to scale up to a few million users, have an innate limitation of delay in the insertion of the advertisement due to the large processing time. For instance, serving advertisements to millions of users watching a live cricket match from different location is a time taking process as it requires high processing time to serve the advertisement to users based on per user interest.

Therefore, it is apparent from the aforementioned problems and limitations, that there exists a need to provide an efficient method and system for real-time delivery of the target content i.e., advertisement in a streaming content to multiple segments or groups of users.

SUMMARY

This section is provided to introduce certain objects and aspects of the present disclosure in a simplified form that are further described below in the detailed description. This summary is not intended to identify the key features or the scope of the claimed subject matter.

In order to overcome at least a few problems associated with the known solutions as provided in the previous section, an object of the present disclosure is to provide an efficient method and system for real-time delivery of target content in a streaming content. It is also an object of the present disclosure to provide method and system for dynamic optimization and management of insertion of target content in one of live streaming and playback content. It is another object of the present disclosure to provide method and system to save processing time and to increase efficiency of insertion of target content in a live streaming content. It is yet another object of the present disclosure to provide method and system for dynamic and real-time insertion of target content in streaming content, without any additional delay. It is yet another object of the present disclosure to provide method and system for real-time fetching of target content based on a plurality of parameters such as user segment information, based on at least one target content campaigns, based on the past interaction of the at least one user device with the served target content, based on concurrency of the users watching the same streaming content, based on target content impression rate, based on clicks per target content and the like. It is yet another object of the present disclosure to provide method and system for creation of a customized virtual manifest comprising of requested streaming content URLs and target content URLs. It is yet another object of the present disclosure to deliver the at least one target content in the requested streaming content to the at least one user device requesting for the streaming content based on the customized virtual manifest. It is yet another object of the present disclosure to store the customized virtual manifest in a Content Streaming Server cache and serving the same customized virtual manifest to similar users requesting for the same streaming content. It is yet another object of the present disclosure to identify the cohort or segment of the at least one user device requesting for the streaming of the content and delivering the customized virtual manifest, stored in the Content Streaming Server cache, to the at least one user device based on the identified cohort.

In order to achieve the aforementioned objectives, the present disclosure provides a method and a system for real-time delivery of target content in a streaming content.

One aspect of the present disclosure relates to a method of real-time delivery of a target content in a streaming content. The method comprises receiving, at a Content Management Server, a request for the streaming content from at least one user device. The request comprises user segment information associated with the at least one user device. Next, the method comprises dynamically fetching, by a Content Handling Server, at least one target content for the at least one user device from a Target Content Server based on the user segment information. Next, the method comprises creating, by the Content Handling Server, a customized virtual manifest for the at least one user device by inserting the at least one target content in the requested streaming content in real-time. Next, the method comprises sending, by the Content Handling Server, the customized virtual manifest to the at least one user device based on the user segment information. Thereafter, the method comprises delivering, by a Content Streaming Server, the at least one target content in the requested streaming content to the at least one user device based on the customized virtual manifest.

Another aspect of the present disclosure relates to a system for real-time delivery of a target content in a streaming content. The system comprises a Content Management Server. The Content Management Server is configured to receive a request for streaming content from at least one user device. The request comprises user segment information associated with the at least one user device. Next, the system comprises a Content Handling Server. The Content Handling Server is connected with the Content Management Server. The Content Handling Server is configured to dynamically fetch at least one target content for the at least one user device from a Target Content Server based on the user segment information. Next, the Content Handling Server is configured to create a customized virtual manifest for the at least one user device by inserting the at least one target content in the requested streaming content in real-time. Next, the Content Handling Server is configured to send the customized virtual manifest to the at least one user device based on the user segment information. Next, the system comprises a Content Streaming Server. The Content Streaming Server are connected with the Content Management Server and the Content Handling Server. The Content Streaming Server are configured to deliver the at least one target content in the requested streaming content to the at least one user device based on the customized virtual manifest.

Yet another aspect of the present invention relates to a non-transient computer-readable medium comprising instructions for causing a computer to perform the method of receiving a request for streaming content from at least one user device, wherein the request comprises user segment information associated with the at least one user device; dynamically fetching at least one target content for the at least one user device from a Target Content Server based on the user segment information; creating a customized virtual manifest for the at least one user device by inserting the at least one target content in the requested streaming content in real-time; sending the customized virtual manifest to the at least one user device based on the user segment information; and delivering the at least one target content in the requested streaming content to the at least one user device based on the customized virtual manifest.

BRIEF DESCRIPTION OF THE DRAWINGS

The accompanying drawings, which are incorporated herein, and constitute a part of this disclosure. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components. Although exemplary connections between sub-components have been shown in the accompanying drawings, it will be appreciated by those skilled in the art, that other connections may also be possible, without departing from the scope of the present disclosure. All sub-components within a component may be connected to each other, unless otherwise indicated.

Figure 1:
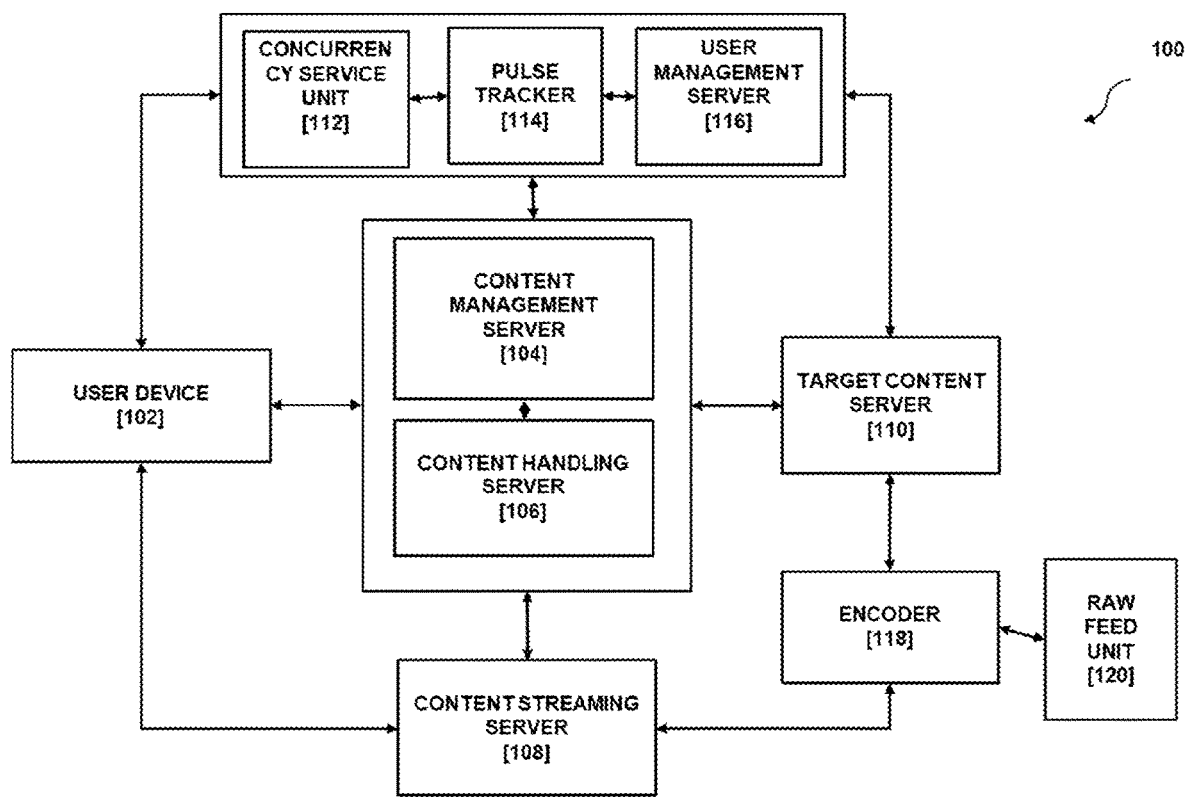
FIG. 1 illustrates an exemplary block diagram of a system [100] for real-time delivery of a target content in a streaming content, in accordance with exemplary embodiments of the present disclosure.

The foregoing shall be more apparent from the following more detailed description of the present disclosure.

DETAILED DESCRIPTION OF THE INVENTION

In the following description, for the purposes of explanation, various specific details are set forth in order to provide a thorough understanding of the embodiments of the present disclosure. It will be apparent, however, that embodiments of the present disclosure may be practiced without these specific details. Several features described hereafter can each be used independently of one another or with any combination of other features. An individual feature may not address any of the problems discussed above or might address only some of the problems discussed above. Some of the problems discussed above might not be fully addressed by any of the features described herein. Example embodiments of the present disclosure is described below, as illustrated in various drawings.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the present disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram.

Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, "connect", "configure", "couple" and its cognate terms, such as "connects", "connected", "configured" and "coupled" may include a physical connection (such as a wired and/or wireless connection), a logical connection (such as through logical gates of semiconducting device), other suitable connections, or a combination of such connections, as may be obvious to a skilled person.

As used herein, "send", "transfer", "transmit", and their cognate terms like "sending", "sent", "transferring", "transmitting", "transferred", "transmitted", etc. include sending or transporting data or information from one unit or component to another unit or component, wherein the content may or may not be modified before or after sending, transferring, transmitting.

As used herein, a "processor" or "processing unit" includes one or more processors, wherein processor refers to any logic circuitry for processing instructions. A processor may be a general-purpose processor, a special purpose processor, a conventional processor, a digital signal processor, a plurality of microprocessors, one or more microprocessors in association with a DSP core, a controller, a microcontroller, Application Specific Integrated Circuits, Field Programmable Gate Array circuits, any other type of integrated circuits, etc. The processor may perform signal coding data processing, input/output processing, and/or any other functionality that enables the working of the system according to the present disclosure. More specifically, the processor or processing unit is a hardware processor.

As used herein, "database" "memory unit", "storage unit" and/or "memory" refers to a machine or computer-readable medium including any mechanism for storing information in a form readable by a computer or similar machine. For example, a computer-readable medium includes read-only memory ("ROM"), random access memory ("RAM"), magnetic disk storage media, optical storage media, flash memory devices or other types of machine-accessible storage media.

The memory is configured to store software programs, modules, data, information, instructions and the like. The memory is further configured to allow the processor to execute various functional disclosures and data processing by running software programs and modules stored in the memory. The memory may include, but is not limited to, a volatile memory, non-volatile memory, a remote storage, a cloud storage, high-speed random-access memory and/or non-volatile memory, such as one or more magnetic disk storage devices, one or more optical storage devices, and/or flash memory (e.g., NAND, NOR) or a combination thereof.

As used herein 'computer readable media' refers to both volatile and non-volatile media, removable and non-removable media, any available medium that may be accessed by the computing device. By way of example and not limitation, computer readable media comprise computer storage media and communication media.

As used herein, a "cohort" or "segment" refers to a group of one or more users accessing the common streaming content on one or more user devices within the same time period, wherein the one or more users are grouped under one cohort based on the similarities of the one or more characteristics and/or behaviors between the users, for example, requested streaming content, gender, age group, location, network type, network provider, bandwidth, an event etc.

In an example, a cohort includes 50 k male users having age in between 20-25, wherein each user accesses the live cricket match from a same state say X. The present disclosure encompasses that a size of cohort unit is configurable. In a non-limiting embodiment, each cohort may include the user devices lies in a range from 1 to 1 Million.

As used herein, a "manifest" is a log or record of all the information relating to the transfer of the requested streaming content and/or target content to the at least one user device including, but not limiting to, the number of segments in a stream of data to be transferred, the size of the segments to be transferred, the links (URLs) associated with one of the requested streaming content and the target content.

As used herein, a "customized virtual manifest" refers to a log or record of all the information associated with insertion of at least one target content segments in between the streaming content segments based on the user segment information for each cohort. Further, the target content segment in the customized virtual manifest vary as per the cohort, while the streaming content segments remain identical for the plurality of cohorts.

As used herein, the "segments" in respect of an streaming content contain digital data relating to any type of live or pre-recorded audio/video content or program segment, including, but not limited to, live shows, recorded over-the-air free network TV shows or programs, paid TV broadcast programs, free-to-air satellite TV shows or programs, IPTV programs, etc., Over-The-Top (OTT) and video-on demand (VOD) or movie-on-demand shows or programs, as well as other content provided by publishers, owners or providers, including but not limited to online radio shows/programs, entertainment shows, educational shows, movies, music video programs, quiz shows and the like. The present disclosure encompasses that the segments may be encoded using suitable ABR streaming techniques such as HTTP Streaming (for instance, Dynamic Adaptive Streaming over HTTP or DASH, HTTP Live Streaming or HLS, HTTP Dynamic Streaming or HDS, etc.), Icecast and the like.

As used herein, "User Equipment", "user device" and/or "communication device", may be any electrical, electronic, electromechanical and computing device or equipment, having one or more transceiver unit and display unit installed on it. The user device is configured to display streaming and target content to the user using wired and/or wireless communication network. The communication device may include but is not limited to, a mobile phone, smartphone, laptop, a general-purpose computer, desktop, personal digital assistant, tablet computer, wearable device or any other computing device which is capable of implementing the features of the present disclosure and is obvious to a person skilled in the art.

As used herein, "communication network" refers to a network capable to transfer data packets between the source point and the destination point using either wired communication or wireless communication. The wired communication or wireline communication refers to the transmission of data over a wire-based communication technology while the wireless communication refers to electromagnetic transfer of data between two or more points that are not connected by any electrical wire or electrical conductor.

In an example, the wired communication network includes Local Area Network [LAN], fiber optic communication and the wireless communication network include an LTE network, a 4G network, a GSM network, a 5G network, or may include a Wi-Fi network.

As used herein, "streaming" refers to a way of watching audio-visual content or listening audio content without downloading the desired content to a local memory/server and storing the downloaded content in a storage device. Further, streaming can be defined as continuous transmission of audio/video content on the user device with a wired and/or wireless communication network.

As used herein "streaming content" refers to a content displayed to one or more users based on the request of the one or more users for watching the audio/video content. The streaming content may include one of a live content or playback content. The live content corresponds to the content directly streaming on the screen of the user device in real-time using communication network. Further, the live stream content can also correspond to the content not being recorded or stored, while the playback content corresponds to a recorded/uploaded or stored content and can be displayed/streamed on the user device associated with the user anytime based on the request of the user. In a non-limiting example, the live streaming content include a live cricket match, a live speech, live news shows, live broadcast program/shows and the like, while the playback content includes but not limited to an uploaded/recorded movies, tv shows, matches, entertainment shows, speech, audio-on demand shows, video-on demand shows or programs and the like.

As used herein, "target content campaign" refers to a campaign run to inform and convince the target users for buying/purchasing the products/services associated with the target content based on the user segment information.

As used herein "target content" refers to an "advertisement", or "ad" or "advert", or commercial which can be defined as a content associated with products and/or services that are characteristics to a user(s) and/or cohort of users requiring attention of said users watching the streaming content. The target content comprises features including but not limited to any text, image, gif, short audio-visual content, audio content, video content and the like used for the promotion or selling of the product/services. Further, with reference to the present disclosure, the "target content" refers to the advertisement served to the plurality of cohorts based on the user segment information associated with users of the cohort.

As used herein, "Encoder" refers to a hardware unit configured to encode the content for transmission. The encoding may be done using any known using suitable encoding technique such as Alternate Bitrate Streaming (ABR) technique and HTTP Streaming for instance, Dynamic Adaptive Streaming over HTTP or DASH, HTTP Live Streaming or HLS, HTTP Dynamic Streaming or HDS, Microsoft Smooth Streaming, QuavStreams Adaptive Streaming over HTTP, upLynk and the like. For example, a live cricket match to be streamed on the user device may be encoded using the DASH encoding technique for ABR streaming by the encoder As used herein, "Content Streaming Server" refer to an overlay network architecture for high-performance streaming of audio-visual data to users using one or more Internet based infrastructures, private/dedicated infrastructures or a combination thereof.

As used herein, the "media player" may be an application on the at least one user device [102] which is capable to support streaming of audio-visual content from Content Streaming Server [108] and play it on the user device [202] in response to a request from the user. The media player is configured to receive the audio-visual data from the playback buffer for playback on the user device [102].

As used herein, the "target impression" refer to an event of viewing the target content by the user of the user device in the requested streaming content. Further, the "target impressions" refer to a count of total number of times the target content displayed to the users of the cohort.

As used herein, the "click per target content" refers to an event of clicking on the target content by the user based on the interest of the user in the target content. Further, the "click per target content" refers to the action taken by the user of the user device on the target content served to the user in the requested streaming content.

Hereinafter, exemplary embodiments of the present disclosure will be described in detail with reference to the accompanying drawings so that those skilled in the art can easily carry out the present disclosure.

As also discussed above, in the existing solutions, ad insertion in a live streaming media is done on a per user basis. Insertion of the advertisement for a large number of users based on the interest of each user is a time taking and inefficient technique also leads to delay in the insertion of advertisement in a streaming content. Since number of concurrent users in a live streaming scenario are very high, of the order of millions, the existing solutions are unable to scale to such large numbers as the entire processing of insertion of the ad in the streaming content is done separately for each user.

The present disclosure provides solution to the above-mentioned problem for dynamic and real-time delivery of a target content in a live streaming content. The present disclosure includes receiving of a request for either a live streaming content or a playback content from at least one user device associated with at least one user. Next, the present disclosure includes taking user segment information associated with the at least one user from at least one of URL associated with the received request, User Management Server, and Concurrency Service Unit. The user segment information includes the data associated with the user accessing the at least one user device such as but not limited to age, gender, nationality, location, type of network, likes/dislikes of the at least one user, occupation details. Next, the present disclosure encompasses dynamically fetching of the at least one target content for the at least one user device from a target content server based on the segment associated with the user segment information. The fetching of the at least one target content for the at least one user device is further performed by first analyzing the user segment information and then identifying the segment or cohort associated with the user segment information. For instance, the present disclosure may identify cohort X corresponding to the at least one user based on the similarity of the user segment information of the at least one user with the users currently watching the same streaming content over the wired and/or wireless network.

Thereafter, the at least one target content is determined for the cohort of the at least one user based on mapping of the parameters between the cohort of the at least one user with at least one of a plurality of target content campaigns, running for serving of the target content to the users. After fetching of the at least one target content for the segment of the at least one user device, the present disclosure creates a customized virtual manifest for the at least one user device by inserting the at least one target content in the requested live streaming content. Thereafter, the present disclosure includes sending of the created customized virtual manifest to the at least one user device based on the user segment information. Finally, the present disclosure fetch and deliver the at least one target content in the requested streaming content to the at least one user device based on the customized virtual manifest.

The present disclosure further comprises storing the customized virtual manifest created for the at least one user device in the Content Streaming Server cache and then directly sharing the customized virtual manifest to the at least one new user device in an event the user segment information received from the at least one new user device matches with the user segment information received from the at least one user device.

The present disclosure creates the customized virtual manifest for the at least one user device only in an event the corresponding customized virtual manifest for the segment of the at least one user device is not present or identified in a Content Streaming Server cache.

The present disclosure is capable of handling the excessive load reaching, for instance, to 25-30 million users, by directly delivering the at least one target content in the requested streaming content based on the use of the customized virtual manifest, stored in the Content Streaming Server cache for each of a plurality of segments or cohorts. The present disclosure performs fetching of the at least one target content and creation of the customized virtual manifest on segment level, thereby providing the efficient management of the operation of insertion of the at least one target content in the requested streaming content for even millions of users in less time.

In an example, for a live media stream X, and cohort A and cohort B, a customized virtual manifest S1 may be created for cohort A and a customized virtual manifest S2 may be created for cohort B. In this example, all the users in cohort A receive the content associated with the virtual manifest S1 when they play the live media on their respective user devices. Further, the virtual manifest S1 includes the live streaming media and a target content AD1, such that the target content AD1 is relevant for the users in cohort A. These virtual manifest S1 and S2 are cached on the Content Streaming Server and are re-used for users belonging to cohorts A and B respectively. This makes the ad insertion process dynamic as well as scalable.

Referring to FIG. 1, an exemplary block diagram of a system for real-time delivery of a target content in a streaming content, is disclosed in accordance with exemplary embodiments of the present disclosure. The system [100] comprises of at least one user device [102], a Content Management Server (CMS) [104], a Content Handling Server [106], a Content Streaming Server [108], a Target Content Server [110], a Concurrency Service Unit [112], a Pulse Tracker [114], a User Management Server [116], an Encoder [118], wherein all the components are assumed to be connected to each other unless otherwise indicated below. Also, in FIG. 1 only Content Management Server (CMS) [104], one Content Handling Server [106], one Content Streaming Server [108], one Target Content Server [110], one Concurrency Service Unit [112], one Pulse Tracker [114], one User Management Server [116], and one Encoder [118] is shown, however, the System [100] may comprise multiple such units/modules/server or the system may comprise any such numbers of said units/modules/servers, as may be required to implement the features of the present disclosure. Also, there may be one or more sub-units of said units and modules of the system [100] and the same is not shown in the FIG. 1 for clarity. Further, each of the units/server/modules are connected with each other through wired or wireless communication network (not shown in FIG. 1 for clarity).

The system includes the at least one user device [102]. The at least one user device [102] is configured to access the streaming content via a media player of the at least one user device over a wired and/or wireless communication network. The streaming content corresponds to one of audio content, video content, audio-visual content, user-interactive content. In an example, the audio content may include but not limited to any speech, voice songs, the video content may include but not limited to any video song, the audio-visual content may include but not limited to any press conference with audio as well as video feature and the user-interactive content may include any quiz, exhibition, webinar, online classes/lectures, online games and the like. Further, the streaming content includes one of a live streaming content and a playback content. In an example, the at least one user device is configured to receive live stream of a cricket match. In another example, the at least one user device is configured to receive stream of video on demand (VOD) content such as stream of movies, shows.

In an embodiment, the at least one user device [102] may receive various types of audio-visual content via a streaming session over a suitable wired and/or wireless communication network which supports streaming of audio-visual sessions. The at least one user device [102] is also configured to include the media player to send a request for streaming of the desired content to the Content Management Server (CMS) [104], for e.g., the at least one user device [102] requests for live video streaming via the media player of the at least one user device [102]. The at least one user device [102] is also configured to play the requested streaming content on the media player of the at least one user device [102]. The at least one user device [102] is associated with at least one user. As used herein, "user" refers to a person or individual looking for the streaming of the content on the at least one user device [102].

The at least one user device [102], in accordance with exemplary embodiments of the present disclosure, comprises of an input unit, a user device transceiver, a playback buffer, a media player, a processor and memory. It will be understood by those of ordinary skill in the art that the structure shown is merely illustrative and does not limit the structure of the at least one user device [102]. The at least one user device [102] may also include more or less components than those listed herein.

The input unit, connected to the user device transceiver, the playback buffer and the media player, is configured to receive an input from a user associated with the user device. The input unit is configured to receive an input from the user to start the media player. In an embodiment, input received from the user may be to start a media player application, connected to user device transceiver and the playback buffer, on the user device [102]. Further, the input unit is also configured to receive an input to play an audio-visual content on the media player.

Further, the input unit may comprise of a touch panel, a soft keypad, a hard keypad (including buttons), a microphone module and the like. For example, the user may click a soft button on a touch panel of the input unit to play an audio-visual content using the media player. In another example, the user may touch an icon on the touch panel to start a media player application on a launcher of the user device [102]. In yet another example, the user may tap on a play icon on a touch panel using a finger to start the playback of a live cricket match on the media player. In another example, the user may tap on an option of play on the touch panel using a finger, in order to playback a video of a song on the media player.

In a preferred embodiment, the input unit may be configured to receive an input from the user via a graphical user interface on the touch panel. As used herein, a "graphical user interface" may be a user interface that allows a user of the user device [102] to interact with the user device [102] through graphical icons and visual indicators, such as secondary notation, and any combination thereof. For example, the input unit may include a touch panel configured to collect the user's input via touch operation, thereon or near the surface of the touch panel, and using a finger or a stylus. The detection of the touch on a graphical user interface of the input unit can be realized by various types such as resistive, capacitive, infrared, and surface acoustic waves. The input unit is further configured to transmit the input received from the user to the user device transceiver. The input unit is also configured to transmit the input received to the media player.

The user device transceiver, connected to the input unit and the playback buffer, is configured to transmit a request to the Content Management Server [104] for streaming of the requested content. In an example, request for streaming of the live cricket match can be send to the Content Management Server [104] by clicking or selecting the option of live cricket match on the media player of the at least one user device. The user device transceiver is also configured to transmit the user segment information associated with the user of the at least one user device [102] to the Content Management Server [104].

The Content Management Server [104] is configured to receive the request for the streaming content from the transceiver of the at least one user device [102] through a wired and/or wireless network. The Content Management Server [104] receives the request from the media player of the at least one user device(s) [102] for the streaming of either live content or playback content. The request received at the Content Management Server [104] comprises of user segment information associated with the at least one user device [102] along with the information associated with the requested streaming content such as type of content, name of content, channel information, and the like. The user segment information is fetched from the request received from the at least one user device. As the request for the streaming content comprises of a content URL having the information of the requested content and a payload message comprising of the user segment information. The payload message is decrypted by the Content Management Server [104] to fetch the user segment information. In an example, the user A click on a 'live cricket match' option available in the media player of the at least one user device. When the user clicks on the option of live cricket match, the information associated with the live cricket match along with the user segment information is sent to the Content Management Server [104].

The user segment information includes the information associated with the at least one user accessing the at least one user device [102]. The user segment information includes but is not limited to demographic information, user profile information, user live location, at least one user interest, at least one user like and at least one user dislike, user interaction pattern with a plurality of target contents in the past, network access by the user on the at least one user device, information associated with the at least one user device. As used herein, "demographic information" includes age, race, ethnicity, gender, marital status, income, education, and employment, homeownership and the like. In an example, the likes and dislikes in the user segment information includes the likes and dislikes of the user specific to any product, services, activities, task and the like which can further help in providing the target content to the user based on the user interest.

The user segment information is further received from at least one of the Concurrency Service Unit [112], and the User Management Server [116]. As used herein, the User Management Server [116] refers to a server configured to store and manage the user segment information of a plurality of users received at the time of registration/subscription of the user on the platform associated with the streaming content. Further, the User Management Server [116] stores the data associated with behavior and interaction of the user with the streaming content delivered on the device of the user. Further, the User Management Server [116] updates the user segment information either in real time or in a predefined interval of time.

Once the user segment information is received at the Content Management Server [104], the Content Management Server [104] is configured to transmit the information pertaining to the requested streaming content to the Content Handling Server [106]. The Content Management Server [104] further sends the user segment information to the Content Handling Server [106].

In a non-limiting embodiment, the Content Management Server [104] has the capability of providing segments associated with the requested content directly to the at least one user device in response to the request received from the at least one user device. The Content Management Server also has the capability to provide default or normal ad content to the at least one user associated with the at least one user devices by fetching the default ad content from a default ad server (not shown in the figure). As used herein, "default ad" refer to an advertisement serve to the user without taking the user segment information into consideration. The Content Management Server has the capability to provide requested content and the default ad content to the at least one user device in case the Content Handling Server [106] fails and thus act as a fallback server. The Content Management Server [104] continues to provide the requested streaming content to the user using conventional techniques for the seamless experience of the user of watching the streaming content in case the Content Handling Server fails. Therefore, the present disclosure has the advantage of including a backup option or a fallback mode to deliver the requested streaming content to the user, however the efficiency of the Content Management Server [104] may not be equivalent to the efficiency of the Content Handling Server [106] in terms of providing the at least one target content on the cohort level because of the use of conventional techniques by the Content Management Server [104]. Moreover, the Content Management Server [104] is not as intelligent enough as the Content Handling Server [106] to take the decision for fetching and delivering of the at least one target content on the cohort level based on the user segment information.

Further, the Content Management Server [104] is configured to check if the content in the requested URL is monetizable. The Content Management Server [104] extract metadata associated with the requested streaming content and thereafter compare the extracted metadata with a trained dataset to determine whether the requested streaming content is monetizable or not. For example, when the president addresses the nation, then based on the comparison of the metadata (such as keywords like president, nation, director of the content, certifications) with the trained dataset, it is determined that the requested content is not a monetizable content. Say, if the content is monetizable, then the Content Management Server [104] is configured to check whether the Content Handling Server [106] is enabled for that particular content. In an event, the Content Handling Server [106] is enabled, the Content Management Server [104] will generate a proxy playback URL pointing to Content Handling Server [106]. As used herein, the Content Management Server [104] may be a centralized server or a decentralized server connected via a wireless or wired communication network.

To efficiently manage the operation of the insertion of the at least one target content in the requested streaming content, the Content Management Server transmits the information pertaining to the requested streaming content to the Content Handling Server [106]. The Content Management Server further sends the user segment information to the Content Handling Server [106].

The Content Handling Server [106] as used herein refers to a server configured to handle the events associated with the delivery of the requested content, delivery of the target content, fetching of the target content, analyzing of the data associated with the delivery of the streaming content and the target content. In a non-limiting embodiment, the Content Handling Server [106] includes one or more processing units or processors (not shown in the figure for clarity) for processing of the data associated with the streaming content and the target content.

The Content Handling server [106] is configured to receive the URL having information of the requested streaming content from one of the at least one user device and Content Management Server [104]. The Content Handling Server [106] is further configured to receive the user segment information from the Content Management Server [104].

The Content Handling Server [106] is further configured to dynamically fetch at least one target content for the at least one user device [102] from a Target Content Server [110] based on the user segment information. In order to fetch the at least one target content for the at least one user device [102], the Content Handling Server [106] first identify at least one cohort associated with the at least one user device based on the analysis and mapping of the user segment information of the at least one user device with user segment information associated with one or more other user devices available in the at least one cohort. In an event, the at least one cohort associated with the at least one user device is identified then the Content Handling Server [106] first fetch the cached customized virtual manifest delivered to the at least one associated cohort based on the user segment information and thereafter deliver the at least one target content in the requested streaming content to the at least one user device via the Content Streaming Server [108]. Next, the Content Handling Server [106] check with the Target Content Server [110] in real-time or in a predefined interval regarding the availability of target content campaigns for at least one of the plurality of cohorts. In an event, a plurality of target content campaign is identified, the Content Handling Server [106] determines the at least one target content to be served to the identified at least one cohort based on the mapping of the one or more first parameters associated with the identified at least one cohort with one or more second parameters associated with at least one of a plurality of target content campaign. The one or more first parameters comprises but not limited to total number of user devices available in the at least one cohort, age group of users accessing the user devices, ratio of male and female users accessing the user devices, location of the users, network access by the users, preference of the users towards product/services and the like. The one or more second parameters comprises but not limited to total number of users required for serving the target content, category of the target content, time of the target content, target content impression goals, click per target content goals, preferred location of the user for serving the target content, preferred gender of the users for serving the target content, preferred age of the users for serving the target content, preferred time for serving the target content and the like. In a non-limiting embodiment, fetching of the at least one target content based on the mapping of the plurality of target content campaign with the plurality of cohorts is performed only when the existing target content campaign running for the at least one cohort gets over.

The fetching the of the at least one target content is further based on live user concurrency data, target content impressions data, clicks per target content data. The target content impressions data and clicks per target content data are received from the Pulse Tracker [114]. As used herein, the Pulse Tracker [114] is configured to track the interaction of the at least one user device with the at least one target content displayed on the at least one user device [102]. Further, the Pulse Tracker [114] is configured to track the response of the at least one user device on the at least one target content displayed to the user. The response of the at least one user device [102] on the at least one target content is considered as positive response in an event the user shows some interest on the at least one target content by either completely watching the target content or by performing action on the at least one target content. In an example, click on the at least one target content by the user of the at least one user device to either purchase the product (associated with the target content) or to check the price of the product is considered as the positive response of the user towards the at least one target content. Thus, positive response of the at least one user device on the at least one target content shows the interest of the user towards the at least one target content. Further, the interest of the user facilitates in determining the at least one like and dislike of the user towards various types or categories of the target contents. Moreover, the target content impression data and click per target content data associated with the users of the plurality of cohorts is received through the Pulse Tracker [114] and shared with the Content Handling Server [106] for optimizing the delivery of the target content in the requested streaming content. Also, the target content impression data and click per target content data associated with the users of the plurality of cohorts is shared with the owners of the target content campaigns for bringing the transparency as well as for targeting the users of the cohorts in response to increase the positive response on the at least one target content.

In an event, a negative response is received on the at least one target content, the Content Handling Server [106] dynamically update the customized virtual manifest with at least one new target content. As used herein, "negative response" or "no response" indicates the behavior of the user showing no interest in the at least one target content served to the user on the at least one user device. Further, the negative response includes but not limited to skipping the at least one target content served in the requested streaming content, scrolling without watching the at least one target content, no action taken by the user on the at least one target content, no interest shown by the user on the at least one target content and the like. Further, updating the customized virtual manifest with the at least one new target content is performed only in an event a majority of the users of the cohort do not show interest in the at least one target content.

The fetching of the at least one target content is further based on the live user concurrency data received from the Concurrency Service Unit [112]. In an example, the live user concurrency data includes but not limited to the login and logout time of each user, total time of each user spent in watching the requested streaming content, number of times the user watching the same requested streaming content, total number of users in a cohort currently watching the same streaming content and the like. The Concurrency Service Unit [112] is configured to provide information about users connected to the streaming. For example, the Concurrency Service Unit [112] may provide information on number of live users in a particular cohort, increase and decrease in the frequency of users watching the streaming content and the like.

Further, the Concurrency Service Unit [112] is configured to capture or collect the data associated with the interaction of the user with the at least one user device [102]. The data associated with the interaction of the user with the at least one user device also refer as "heartbeat information" of the at least one user device and include but not limited to interaction of the user with various applications installed in the at least one user device, behavior of the user towards one or more streaming contents, type of contents accessed by the user on various applications, pattern of the user related to switching in between the plurality of applications, time spent by the user on each application, total time spent by the user on the at least one user device and the like. Thus, the Concurrency Service Unit [112] monitors the activity of the user and collects the monitoring data either in real-time or in a predefined time interval. The data associated with the users currently watching the requested streaming content and data associated with the interaction of the user with the at least one user device facilitates in determining the concurrency of the users watching the streaming content. Also, the data associated with the users currently watching the requested streaming content and data associated with the interaction of the user with the at least one user device facilitates in fetching the relevant at least one target content as per the target content campaign.

After determining the at least one target content for the identified at least one cohort, the Content Handling Server [106] fetches the determined at least one target content from the Target Content Server [110]. Further, the Content Handling Server [106] interacts with the Target Content Server [110] in real-time to identify, determine and fetch the at least one target content for the at least one identified cohort. The at least one identified cohort comprises the at least one user device [102] requesting for the streaming content. Thus, fetching of the at least one target content is performed on cohort or segment level to prevent any delay in the delivery of the target content to the at least one user device.

In an example, the user A is a male having age 45 and location X. Based on the user segment information of the user A, the Content Handling Server [106] identify that cohort H or segment H is associated with the user A and the cohort H include 10 similar users watching the same content as requested by user A. Also, the characteristic of the 10 users in the cohort H are similar to the characteristics of the User A such as gender of all the 10 users is male, location of all the 10 users is X and age group of all the 10 users lies in range of 42-46. Next, the Content Handling Server [106] determines the target content for the cohort H by mapping the one or more first parameters of the cohort H say "concurrency of the cohort" with the one or more second parameters of one of the target content campaigns say "required concurrency". In an example, the target content campaign M requires the presence of at least 10 user devices operated by 10 male users of age group 42-45 in a cohort for serving of the target content related to the Mobile phone. Thus, based on the mapping of the required parameters between the cohort H and the target content campaign M, the Content Handling Server takes decision to fetch the target content associated with the target content campaign M for all the male users including the user A available in the cohort H.

The Content Handling Server [106] is configured to create a customized virtual manifest for the at least one user device [102] after deciding and fetching the at least one target content for the at least one user device [102]. The Content Handling Server [106] creates the customized virtual manifest by inserting the at least one target content in the requested streaming content in real-time. For inserting the at least one target content in the requested streaming content, the Content Handling Server [106] receives an original manifest of the requested streaming session from the Encoder [118] in real-time.

The Encoder [118] is configured to encode the requested streaming content into various bitrates and store the encoded streamed content in the Content Streaming Server [108]. The encoding of the requested streaming content is performed at the time of receiving the data from the source of the content. In the live streaming content, the Encoder [118] receives the requested streaming content in raw form from a raw feed unit [120]. The raw feed unit [120] refers to the source of the content capture, for example, video cameras capturing live cricket.

The Encoder [118] is configured to encode the requested streaming content into a plurality of segments. In a non-limiting embodiment, the requested streaming content is encoded in segments of a uniform small size, or a uniform small length. The Encoder may encode the requested streaming content in a specific quality in one or more bitrate. For example, a content of high resolution of 1080p can be encoded into various bitrates simultaneously such as a segment at 2 mbps and at 4 mbps. The same content can also be encoded at a low quality of 720p into various bitrates simultaneously such as a segment at 1 mbps and at 2 mbps. Further, the Encoder is configured to form segments of the requested streaming content. The Encoder is configured to create segments of encoded streaming content that can be combined to form a stream of the requested streaming content that is transferred to the user device [102]. For example, a video of length 10 seconds is encoded by the Encoder into multiple segments where each segment may be of length 1 second. The Encoder [118] may also be configured to generate an original manifest for the transfer of requested streaming data to the at least one user device [102].

Further the Content Handling Server [106] receives the original manifest associated with the requested streaming content from the Encoder [118]. The Content Handling Server receives the original manifest from the Encoder [118] in a plurality of rendition manifest comprising but not limiting to a 1080 p, 720 p, and 480 p. As used herein, "rendition" refers to a quality of content and comprises one or more characteristics of the content, for e.g. pixels, encoding scheme, etc. Further, each rendition manifest comprises of a plurality of segments associated with the requested streaming content. The Content Handling Server [103] also have the information associated with the at least one device requesting for the streaming content such as but not limited to a user device identifier, playback buffer size, playback buffer time, user's network type, bandwidth, location, and the like. Thus, based on the information associated with the user device, based on the information associated with the length of each encoded segment, and based on the availability of the at least one target content, the Content Handling Server [106] create the customized virtual manifest for the at least one user device. Further, customized virtual manifest is created by inserting the at least one target content in the requested streaming content based on the presence of the SCTE markers in the encoded requested stream. As used herein, the SCTE markers refer to timed metadata, and are used to mark and signal information related to a certain timestamp or time range in a stream. In a non-limiting embodiment, the cloud playout is directly connected with the raw feed unit and is configured to include SCTE markers in the feed directly received from the medium such as playground in a live cricket match scenario. Further, the cloud playout includes SCTE markers based on the real-time scenario of the live cricket match. In an example, when there is a wicket fall in the match, then the Cloud playout may include SCTE markers at that instant of time. Further, the Cloud playout provides the feed of the requested streaming content with the SCTE markers to the Encoding Server. The Encoder [118] encodes the feed of the requested streaming content into a plurality of segments which are then further received by the Content Handling Server via Content Server. The Content Handling Server based on the presence of the SCTE markers inserts the at least one target content in the requested streaming content and therefore creates the customized virtual manifest for the at least one user device.

The Encoder [118] transfers the encoded segments to the Content Streaming Server [108] and the original manifest to the Content Handling Server [106]. The Encoder [118] transfer the encoded segments associated with the requested streaming content to the Content Streaming Server [108] for the delivery of the requested streaming content to the at least one user whenever the user request for the streaming content. The Encoder [118] encompasses that the segments may be encoded using suitable ABR streaming techniques such as HTTP Streaming (for instance, Dynamic Adaptive Streaming over HTTP or DASH, HTTP Live Streaming or HLS, HTTP Dynamic Streaming or HDS, etc.), Icecast and the like.

The Encoder [118] is also configured to ensure that at least one target content is pre-encoded with the same specification as of the requested stream before delivery of the at least one target content to the at least one user device [102]. Further, the at least one target content associated with the target content campaign is encoded prior to the delivery of the at least one target content and stored in the Content Streaming Server in the same format as of the requested streaming content.

The Content Handling server [106] supports at least two kind of streaming protocols, i.e. HLS and DASH. The manifest produced in each of these categories of formats is also different. Thus, the Content Handling Server [106] is further configured to ensure consistency of such manifests with the format supported by the content handling server.

After receiving the manifest associated with the requested streaming content and the at least one target content, the Content Handling Server [106] creates the customized virtual manifest. Further, insertion of the at least one target content in the requested streaming content is performed by inserting one or more Uniform Resource Locator (URLs) associated with the at least one target content with one or more URLs associated with the requested streaming content.

Next, the Content Handling Server [106] is configured to send the customized virtual manifest to the at least one user device based on the user segment information. The Content Handling Server [106] sends the customized virtual manifest to the at least one user device via wired and/or wireless network. The Content Handling Server [106] is further connected with the Content Streaming Server [108]. The Content Handling Server [106] further sends the customized virtual manifest to the Content Streaming Server [108] for delivery of the at least one target content in the requested streaming content.

The Content Streaming Server [108] is configured to deliver the at least one target content in the requested streaming content to the at least one user device based on the customized virtual manifest. As used herein, the Content Streaming Server refers to a group of memory and storage units used to fetch the requested content for the at least one user device. Further, the Content Streaming Server includes but is not limited to distributed Content Delivery Network, a central Content Delivery Network, a public Content Delivery Network, a private Content Delivery Network, a Telecom Content Delivery Network, a content providing CDN network and the like.

The Content Streaming Server [108] provides the segments associated with the manifest to at least one user device in real-time. Thus, the Content Streaming Server [108] delivers the segments associated with the requested streaming content to the at least one user device based on the customized virtual manifest. In the live streaming content, the Encoder receives the content in raw form from a raw feed unit (not shown in the Figure for clarity). The raw feed unit [120] refers to the source of the content capture, for example, video cameras capturing live cricket.

Further, the playback buffer, connected to the user device transceiver and the media player, is configured to store the customized virtual manifest associated with the requested stream and at least one target content. The playback buffer is also configured to transfer the virtual customized manifest associated with the at least one target content and the requested streaming content to the media player to play the requested streaming content and the at least one target content on the at least one user device [102]. The media player receives the segments associated with the customized virtual manifest from the Content Streaming Server and plays the segments as per the customized virtual manifest.

In an example, when a user of the user device [102] requests via the media player to play live cricket broadcast, the media player plays the one or more segments associated with the live cricket match as per the customized virtual manifest. The one or more segments associated with the live cricket match are directly received or fetched from the Content Streaming Server [108] as per the sequence of the URLs associated with the at least one target content and the requested streaming content.

The Content Handling Server [106] is further configured to update the customized virtual manifest in a predefined interval of time based on one or more parameters. The one or more parameters include but are not limited to change in the user segment information, change in the parameters associated with the fetching of the at least one target content, availability of the at least one new target content campaign, expiry of the existing target content campaign. In a non-limiting embodiment, the Content Handling Server [106] update the customized virtual manifest by creating the new customized virtual manifest with insertion of the at least one new target content based on the availability of the new target content campaign for the at least one user device. In another non-limiting embodiment, the Content Handling Server [106] update the customized virtual manifest by directly replacing the segments associated with the at least one existing target content with the new target content as per the availability of the new target content campaign.

Further, the Content Streaming Server [108] is configured to store the customized virtual manifest in the Content Streaming Server cache for the delivery of the at least one target content in the requested streaming content to at least one new user device requesting for the same streaming content and having the similar user segment information as of the at least one user device.

In an event, the Content Management Server [104] receives a request for the streaming content from at least one new user device. The request comprises new user segment information associated with the at least one new user device. The Content Handling Server [106] compares the new user segment information with the user segment information received from the at least one user device. Next, the Content Handling Server [106] sends the customized virtual manifest, stored in a Content Streaming Server cache, to the at least one new user device in an event the new user segment information matches with the user segment information received from the at least one user device. Thereafter, the Content Streaming Server [108] is configured to deliver the at least one target content in the requested streaming content to each of the at least one new user device based on the customized virtual manifest.

Further, the Content Handling Server [106] creates a new customized virtual manifest in an event the new user segment information does not match with the user segment information received from the at least one user device. The new customized virtual manifest is created based on the new user segment information and stored in the Content Streaming Server cache. Next, the Content Handling Server [106] sends the new customized virtual manifest to each of the at least one new user device based on the new user segment information. Thereafter, the Content Streaming Server [108] deliver the at least one target content in the requested live streaming content to each of the at least one new user device based on the new customized virtual manifest.

Figure 2:
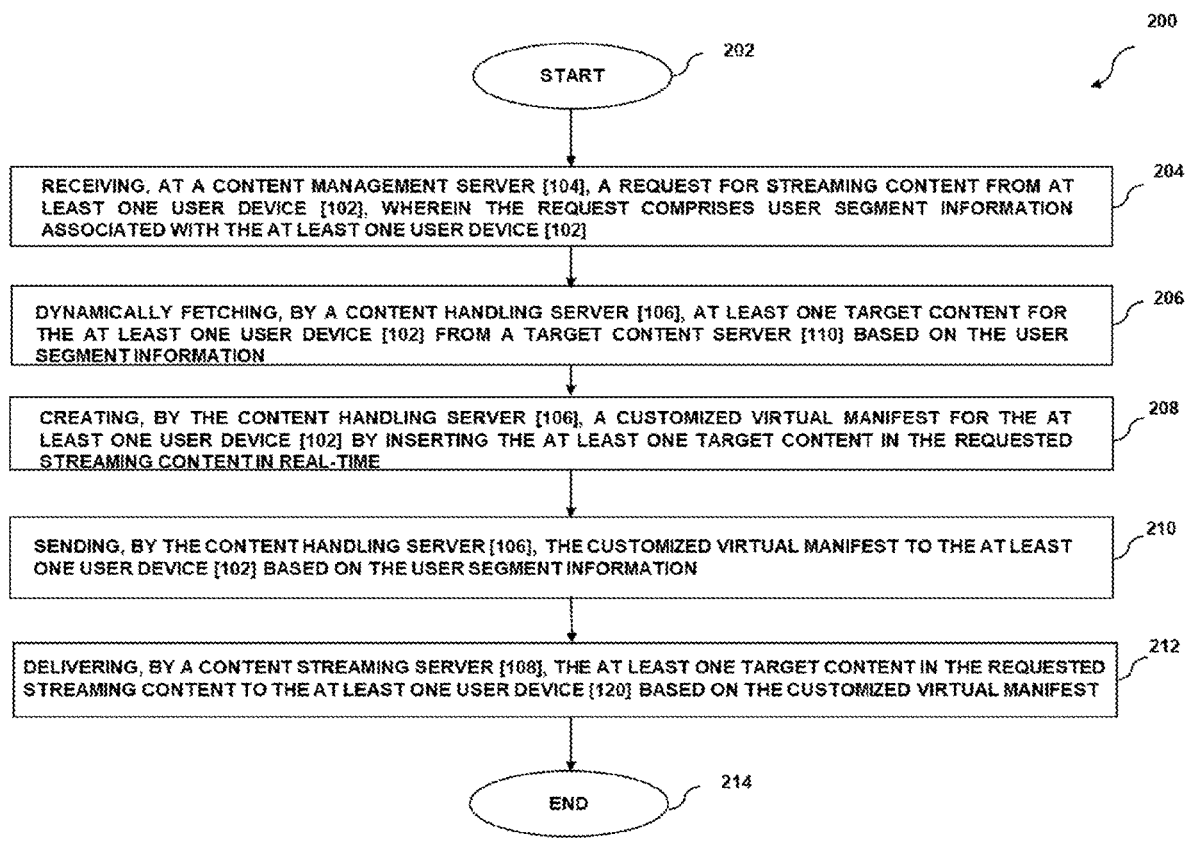
FIG. 2 illustrates an exemplary method flow diagram [200] for real-time delivery of the target content in the streaming content, in accordance with exemplary embodiments of the present disclosure.

Referring to FIG. 2, an exemplary method flow diagram [200], depicting a method for real-time delivery of a target content in a streaming content. As shown in FIG. 2, the method begins at step [202].

At step [204], the method comprises receiving, at a Content Management Server [104], a request for the streaming content from at least one user device [102]. The request for the streaming content is received from the at least one user device [102] at the Content Management server [104] via a media player of the at least one user device [102] via a wired and/or wireless mode.

The streaming content corresponds to one of audio content, video content, audio-visual content, and user-interactive content. Further, the streaming content is one of live streaming content and playback content. The request received at the Content Management Server [104] comprises user segment information associated with the at least one user device. Further, the user segment information is received at the Content Management Server [104] from at least one of a User Management Server [116], and a Concurrency Service Unit [112]. The user segment information includes but is not limited to demographic information, user profile information, user live location, at least one user interest, at least one user like/preference and at least one user dislike, user interaction pattern with a plurality of target contents in the past, network access by the user of the at least one user device [102], information associated with the at least one user device [102].

Next, at step [206], the method comprises dynamically fetching, by a Content Handling Server [106], at least one target content for each of the at least one user device [102] from a Target Content Server [110] based on the user segment information. The Target Content Server [110] acts as an interface for the management of the inventory associated with the target content, for assisting the Content Handling Server [106] in fetching of the at least one relevant target content, for providing the data associated with the target content such as number of segments, time of target content, category of target content, type of target content, form of the target content, most preferred target content and the like. The Content Handling Server [106] interact with the Target Content Server [110] to take the decision of fetching of the at least one target content for the at least one user based on the associated user segment information. Further, the Content Handling Server [106] fetch the at least one target content at the cohort level based on the identification of the at least one cohort associated with the user segment information of the at least one user device. The identification of the at least one cohort associated with the at least one user device is performed based on the analysis and mapping of the user segment information of the at least one user device with the user segment information associated with one or more other user devices available the at least one cohort. In an example, the age and gender of the user accessing the at least one user device match with the 100 users watching the same stream as requested by the user. After identification of the at least one cohort associated with the at least one user device, the method includes determining, by the Content Handling Server, the at least one target content to be served to the identified at least one cohort based on the mapping of the one or more first parameters associated with identified at least one cohort and one or more second parameters associated with at least one of a plurality of target content campaigns. In an example, the one or more first parameters comprise the number of users in the at least one cohort currently watching the stream of the live cricket match, age group of the users in the at least one cohort watching the stream of the live cricket match, ratio of gender of users in the at least one cohort watching the stream of the live cricket match and the like. In an example, the one or more second parameters comprise the number of user devices required to serve the at least one target content, category and type of the target content, domain of the target content, time require for serving of the target content, target content impressions data, clicks per target content data and the like. Thus, mapping of the first one or more parameters with the second one or more parameters decides which target content to be served to which cohort. Based on this, the target content is fetched for the at least one cohort having the at least one user device requesting for the streaming content.

In an example, the target content associated with the cosmetics products are preferred to be served to the female users and the target content associated with the toys are preferred to be served to the kid's users.

Further, the Content Handling Server [106] is configured to dynamically fetch the at least one target content for the at least one cohort associated with the at least one user device based on the on live user concurrency data, target content impressions data, clicks per target content data.

The live user concurrency data is received from a Concurrency Service Unit [112] and the target content impressions data and clicks per target content data is received from a Pulse Tracker [114].

The pulse tracker [114] determines an accurate impression mapping for the at least one target content. Along with the Concurrency Service Unit [112], the pulse tracker [114] determines the best relevant target content based on at least the live concurrency and the impression delivered so far for the at least one target content delivered to the respective cohort. For example, Concurrency Service Unit [112] may provide number of users streaming the live match per user segment/cohort, and the Pulse Tracker [114] provides number of clicks for a particular target content by that user segment.

Next, at step [208], the method comprises creating, by the Content Handling Server [106], a customized virtual manifest for the at least one user device [102] by inserting the at least one target content in the requested streaming content in real-time. Further, the creation of the customized virtual manifest for the at least one user device is performed based on the segment/cohort of the user. The customized virtual manifest for the at least one user device is created only after checking the existence of the customized virtual manifest in the Content Streaming Server cache. In an event, the customized virtual manifest associated with the segment of the at least one user device is identified in the Content Streaming Server cache, the Content Streaming Server directly send the customized virtual manifest to the at least one user device without again creating the customized virtual manifest. In an event, the customized virtual manifest associated with the segment of the at least one user device is not identified in the Content Streaming Server cache, the Content Handling Server first create the customized virtual manifest for the segment of the at least one user device. The customized virtual manifest for the segment of the at least one user device is created by inserting the manifest associated with the at least one target content fetched for the segment of the at least one user device in the manifest associated with the requested streaming content. In general, the one or more URLs associated with the at least one target content is inserted in the one or more URLs associated with the requested streaming content. Each URL represents a corresponding segment of the content. For example, the customized virtual manifest comprises of total 5 URLs in which the first two URLs and last two URLs represent the segment of the requested streaming content and the third URL represent the segment of the at least one target content. Thus, after displaying the stream associated with the first two URLs, the system will display a target content whenever it reaches to the third URL associated with the target content.

Next, at step [210], the method comprises sending, by the Content Handling Server [106], the customized virtual manifest to each of the at least one user device [102] based on the user segment information. After creating the customized virtual stream for the segment of the at least one user device [102], the Content Handling Server [106] shares or sends the customized virtual manifest to the at least one user device [102] and the Content Streaming Server [108]. In a non-limiting embodiment, the customized virtual manifest received at the at least one user device gets stored in the memory of the at least one user device for fetching of the segments based on the streaming experience of the user. Also, the customized virtual manifest received at the Content Streaming Server gets stored in the Content Streaming Server cache for delivery of the same customized virtual manifest to the similar segments of the at least one user device.

Next, at step [212], the method comprises delivering, by a Content Streaming Server [108], the at least one target content in the requested streaming content to each of the at least one user device [102] based on the customized virtual manifest. The Content Streaming Server [108] holds the segments associated with the requested streaming content and the target content. The Content Streaming Server [108] is connected with the Encoder and the target content server to receive the segments associated with the requested streaming content and the at least one target content respectively. The segments associated with the requested streaming content is directly fetched by the Encoder [118] from the raw feed unit [120] and then encoded by the Encoder [118] in various qualities/renditions. In an example, the at least one user device is not capable to play the content having 1080 resolution, thereby the Encoder reduces the resolution as per the at least one user device and transfers the encoded segments to the at least one user device via Content Streaming Server. Further, the at least one user device includes the playback buffer, connected to the user device transceiver and the media player, is configured to store the manifest associated with the requested stream and at least one target content. The playback buffer is also configured to transfer the customized virtual manifest to the media player to play the requested streaming content on the at least one user device [102]. The user device transceiver is configured to fetch the stream of at least one target content and the stream of the requested streaming content from the Content Streaming Server [108] based on the customized virtual manifest received from the Content Handling Server [106].

For example, the manifest of the live cricket match and the target content is stored in the playback buffer and the at least one target content and the segments of the live cricket match are fetched from the Content Streaming Server [108] based on the sequence of the manifest. The media player plays the segments as per the sequence defined in the customized virtual manifest.

The Content Streaming Server [108] is further configured to deliver the at least one target content in the requested streaming content to at least one new user devices based on the existence of the customized virtual manifest in the Content Streaming Server cache and based on the similarity of the segment of the information between the at least one user devices and the at least one new user devices.

In a non-limiting embodiment, the method includes receiving, at the Content Management Server [104], a request for the streaming content from at least one new user device. The request comprises new user segment information associated with the at least one new user device. Next, the method includes comparing, by the Content Handling Server [106], the new user segment information with the user segment information received from the at least one user device. Next, the Content Handling Server [106] sends the customized virtual manifest, stored in Content Streaming Server cache, to the at least one new user device in an event the new user segment information matches with the user segment information received from the at least one user device.

The method further includes creating, by the Content Handling Server [106], a new customized virtual manifest in an event the new user segment information does not match with the user segment information received from the at least one user device [102]. The new customized virtual manifest is created based on the new user segment information. Next, the method includes sending, by the Content Handling Server [106], the new customized virtual manifest to the at least one new user device based on the new user segment information. Next, the method includes delivering, by the Content Streaming Server [108], the at least one target content in the requested streaming content to each of the at least one new user device based on the new customized virtual manifest. Thereafter, the method further includes storing, by the Content Streaming Server [108], the new customized virtual manifest in the Content Streaming Server [108] cache for serving the same customized virtual manifest to the at least one other user devices having similar segment as of the at least one new user devices.

After delivering the at least one target content in the requested streaming content to the at least one user device and storing the associated customized virtual manifest in the Content Streaming Server cache, the method terminates at step [214].

Figure 3:
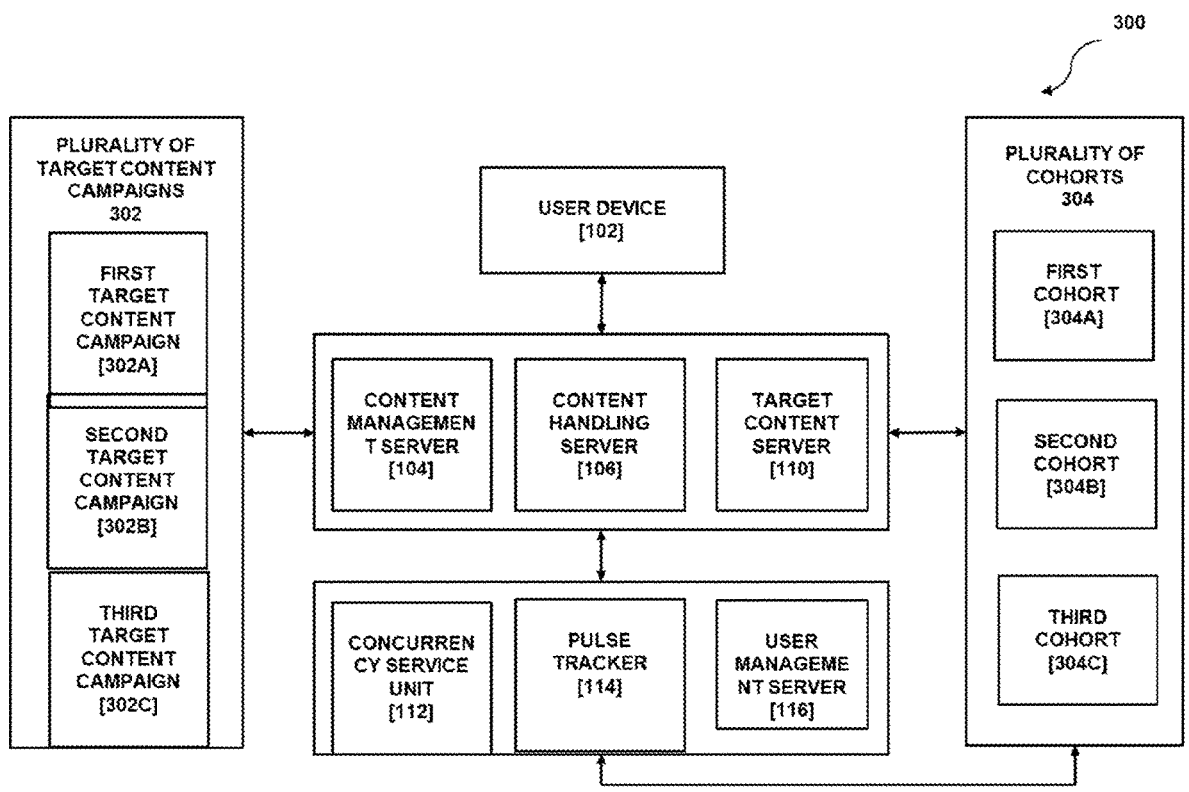
FIG. 3 illustrates an exemplary block diagram [300] for fetching of the target content, in accordance with exemplary embodiments of the present disclosure.

FIG. 3 illustrates an exemplary block diagram [300] for fetching of at least one target content, in accordance with exemplary embodiments of the present invention. The exemplary block diagram [300] includes the at least one user device [102], the Content Management Server (CMS) [104], the Content Handling Server [106], the Target Content Server [110], the Concurrency Service Unit [112], the Pulse Tracker [114], the User Management Server [116]. Further, the exemplary block diagram [300] illustrates a plurality of target content campaigns [302] running for serving of the at least one target content to the users of a plurality of cohorts. The plurality of cohorts includes a plurality of users currently watching a live streaming content on their user devices. As also discussed in detail in the FIG. 1, the at least one user device [102] via a media player sends a request to the Content Management Server [104] for streaming content e.g., a live cricket match. The Content Management Server [104] also receives the user segment information from the request received from the at least one user device [102] for streaming of the live cricket match. Further, the Content Management Server [104] may also receive the user segment information from at least one of the User Management Server [116], and the Concurrency Service Unit [112]. The user segment information includes but are not limited to demographic information, user profile information, user live location, at least one user interest, at least one user like/preference and at least one user dislike, user interaction pattern with a plurality of target contents in the past, network access by the user on the at least one user device [102], information associated with the at least one user device [102].

The Content Management Server [116] thereafter transmit the information for the requested streaming content and the user segment information to the Content Handling Server [106]. After receiving the user segment information, the Content Handling Server [106] analyze the user segment information and map the analyzed user segment information with the user segment information associated with other users available in the plurality of cohorts [304]. The analysis and mapping of the user segment information is done to identify at least one cohort from the plurality of cohorts [304] associated with the at least one user device [102]. As shown in the exemplary FIG. 3, the plurality of cohorts [304] includes a first cohort [304A], a second cohort [304B], a third cohort [304C]. Each of the plurality of cohorts [304] comprises different characteristic of the user watching the streaming content.

For example, the first cohort [304A] may include 500 male users, having age more than 30 years, watching the live cricket match. The second cohort [304B] may include 200 female users, having age in between 20 to 30 years, watching the live cricket match. The third cohort [304C] may include a total of 100 male and female users, having age less than 20 years, watching the live cricket match. Thus, the Content Handling Server [106] analyze the user segment information to extract age and gender information associated with the user of the at least one user device [102] and then compares the extracted information with users of the first cohort [304A], the second cohort [304B] and the third cohort [304C]. Based on the comparison, the Content Handling Server [106] determines that the user requesting for the streaming of live cricket match via media player of the at least one user device [102] is a female user having age 25 years. Therefore, the Content Handling Server [106] based on the age and gender determine the Second Cohort [304B] as a cohort corresponding to the user of the at least one user device [102].

Next, the Content Handling Server [106] determines the at least one target content that needs to be served to the at least one user device [102] based on the identified Cohort of the at least one user device [102]. The Content Handling Server [106] determines the at least one target content to be served to the identified second cohort [304B] based on the mapping of the one or more first parameters associated with the identified second cohort [304B] with one or more second parameters associated with at least one of a plurality of target content campaigns [302].

In an example, the plurality of target content campaigns [302] includes the first target content campaign [302A], the second target content campaign [302B], and the third target content campaign [302C]. Each of the plurality of target content campaigns [302] includes one or more target contents that need to be served in such a way that it can receive positive response from the users watching the live cricket match. The Content Handling Server [106] takes the decision of serving the at least one target content to the at least one cohort in such a way that positive response can be received from the users of the cohorts on the served target content. In an example, the first target content campaign [302A] include the target content associated with a Vehicle, the second target content campaign [302B] include the target content associated with a cosmetic product, and the third target content campaign [302C] include the target content associated with a stationary product. Further, the first target content campaign [302A] requires the presence of at least 400 users to serve the target content associated with the Vehicle, the second target content campaign [302B] requires the presence of at least 100 users to serve the target content associated with the cosmetic product, and the third target content campaign [302C] requires the presence of at least 50 users to serve the target content associated with the stationary product.

Thus, based on the mapping of the presence of at least 100 users in the second cohort [304B] and based on the preference of the female users towards the cosmetic product, the Content Handling Server [106] may decide to server the target content from the second target content campaign [302B] to the second cohort [304B] based on the analysis and mapping of the required parameters.

Thus, based on the identification of the second cohort [304B] of the at least one user device and based on the mapping of the parameters between the second target content campaign [302B] and the second cohort [304B], the Content Handling Server [106] fetches the manifest of the target content associated with the cosmetic product for the at least one user device [102] and process to create a customized virtual manifest for the at least one user device [102].

Figure 4:
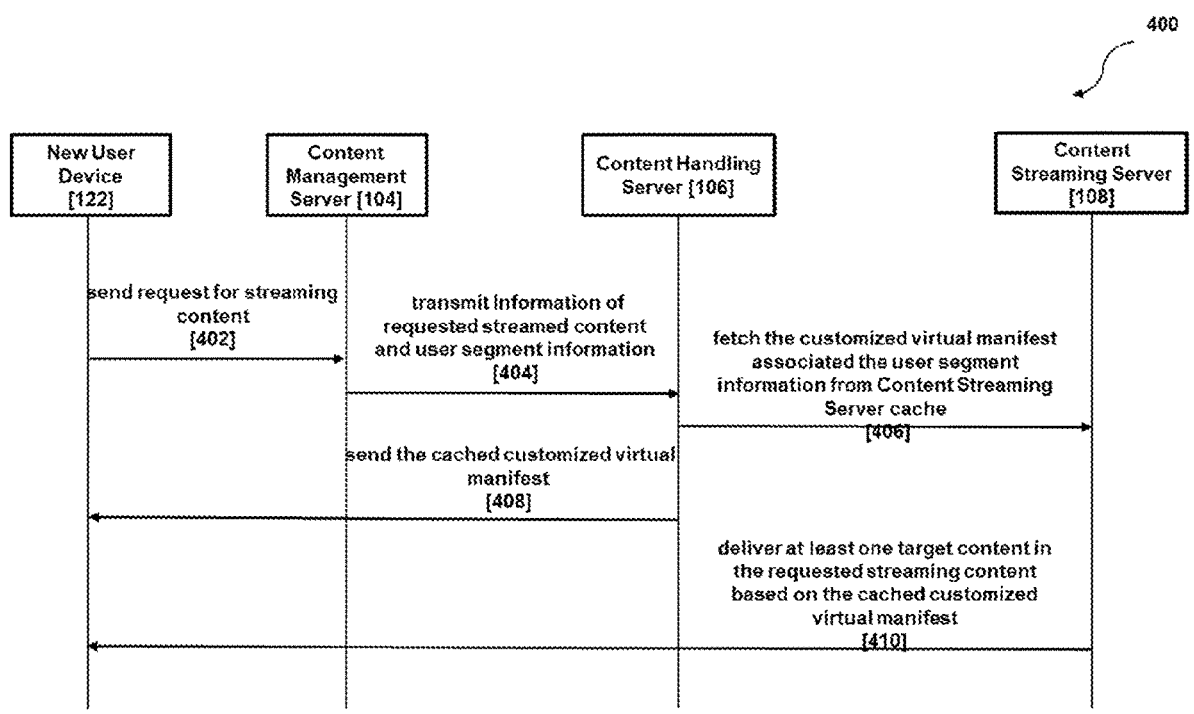
FIG. 4 illustrates an exemplary sequence flow diagram [400] for delivery of target content in the requested streaming content based on the cached customized virtual manifest, in accordance with exemplary embodiments of the present disclosure.

FIG. 4 illustrates an exemplary sequence flow diagram illustrating delivery of at least one target content in the requested streaming content based on the cached customized virtual manifest, in accordance with exemplary embodiments of the present disclosure.

At step [402], a new user device [122] sends a request for the streaming content to the Content Management Server [104]. The request comprises the information associated with the requested streaming content and the user segment information. As already described in detail in FIG. 1, the user segment information may also be received from at least one of the Concurrency Service Unit [112] and the User Management Server [116].

At step [404], the Content Management Server [104] transmits the information of the requested streaming content and the user segment information to the Content Handling Server [106]. The information associated with the requested streaming content and the user segment information is transmitted to the Content Handling Server [106] in real-time.

Next, at step [406], the Content Handling Server [106] fetches the customized virtual manifest associated with the user segment information from the Content Streaming Server cache. The Content Handling Server [106] first interact with the Content Streaming Server [108] to check the presence of the customized virtual manifest associated with the user segment information in the Content Streaming Server cache and thereafter fetches the associated customized virtual manifest from the Content Streaming Server cache. For checking the presence of the customized virtual manifest in the Content Streaming Server cache, the Content Handling Server [106]compares the user segment information received from the new user device [122] with the user segment information received from other user devices to match the user segment information of the new user device with the other user devices currently watching the same requested content. In the event, the match is determined successfully, the Content Handling Server [106] directly fetches the customized virtual manifest associated with the other users from the Content Streaming Server cache.

Next, at step [408], the Content Handling Server [106] sends the cached customized virtual manifest to the new user device [122]. The cached customized virtual manifest comprises of the one or more URLs associated with the at least one target content and the one or more URLs associated with the requested streaming content. The one or more URLs associated with the at least one target content being fetched as per the user segment information while the one or more URLs associated with the requested streaming content remain the same for all the user devices currently watching the requested streaming content.

Thereafter, at step [410], the Content Streaming Server [108] deliver the at least one target content in the requested streaming content to the new user device [122] based on the cached customized virtual manifest. The Content Streaming Server [108] provide the segments associated with the one or more target content URLs and the one or more requested streaming content URLs as per the sequence of the URLs present in the customized virtual manifest.

Figure 5:
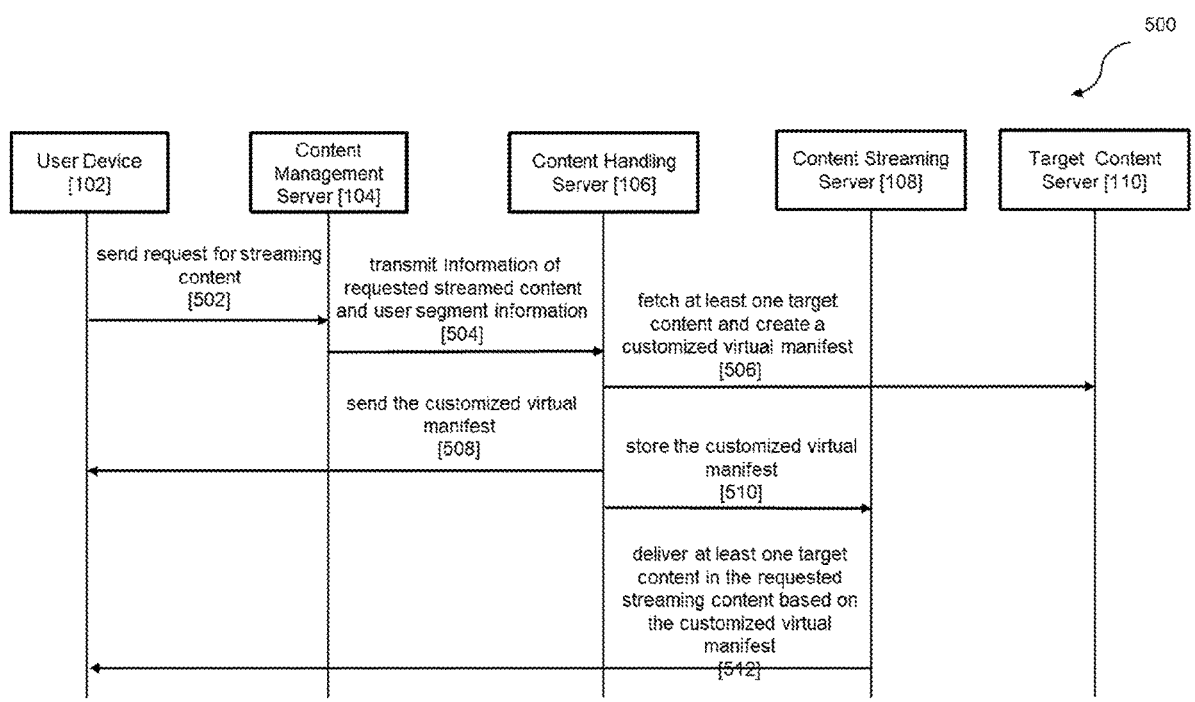
FIG. 5 illustrates an exemplary sequence flow diagram [500] illustrating delivery of at least one target content in the requested streaming content based on unavailability of cached customized virtual manifest, in accordance with exemplary embodiments of the present disclosure.

FIG. 5 illustrates an exemplary sequence flow diagram illustrating delivery of at least one target content in the requested streaming content based on unavailability of the cached customized virtual manifest, in accordance with exemplary embodiments of the present disclosure.

At step [502], a user device [102] sends a request for the streaming content to the Content Management Server [104]. The request comprises of the information associated with the requested streaming content and the user segment information. As already described in detail in FIG. 1, the user segment information may also be received from at least one of the Concurrency Service Unit [112] and the User Management Server [116].

At step [504], the Content Management Server [104] transmits the information of the requested streaming content and the user segment information to the Content Handling Server [106]. The information associated with the requested streaming content and the user segment information is transmitted to the Content Handling Server [106] in real-time.

Next, at step [506], the Content Handling Server [106] fetches at least one target content from the Target Content Server [110] and create a customized virtual manifest associated with the user segment information. The Content Handling Server [106] fetches the at least one target content and create the customized virtual manifest only in an event the corresponding or respective customized virtual manifest associated with the user segment information is not identified in the cache of the Content Streaming Server [108].

As discussed in detail in the FIG. 1 to FIG. 4, the at least one target content for the creation of the customized virtual manifest is fetched based on the user segment information and based on the availability of the target content campaigns.

Next, at step [508], the Content Handling Server [106] sends the customized virtual manifest to the user device [102]. The customized virtual manifest comprises of the one or more URLs associated with the at least one target content and the one or more URLs associated with the requested streaming content.

Next, at step [510], the Content Handling Server [106] store the customized virtual manifest created for the user device [102] in the cache of the Content Streaming Server so that the same customized virtual manifest can be used and served to the other user devices who join later/subsequently (such as to the new user device [122]) in case the user segment information associated with other user devices are found to be similar with the user segment information received from the user device [102].

Thereafter, at step [512], the Content Streaming Server [108] deliver the at least one target content in the requested streaming content to the user device [102] based on the customized virtual manifest. The Content Streaming Server [108] provide the segments associated with the one or more target content URLs and the one or more requested streaming content URLs as per the sequence of the URLs present in the customized virtual manifest.

Figure 6:
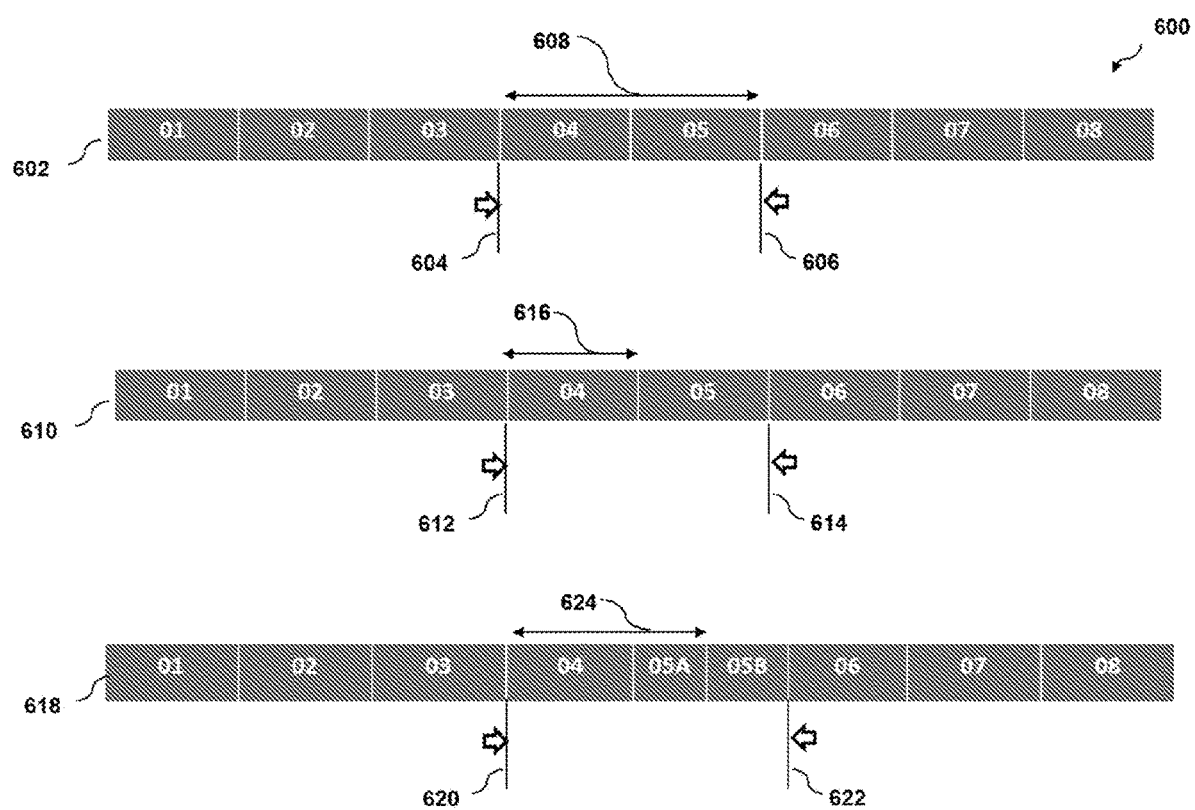
FIG. 6 illustrates an exemplary diagram [600] depicting the customized virtual manifest for a plurality of cohorts, in accordance with exemplary embodiments of the present disclosure.

FIG. 6 illustrates an exemplary diagram [600] depicting an example of customized virtual manifest for a plurality of cohorts, in accordance with exemplary embodiments of the present disclosure. FIG. 6 illustrates an exemplary view of the customized virtual manifest [602, 610, 618] for the plurality of cohorts. The customized virtual manifest [602] is created for a first cohort, the customized virtual manifest [610] is created for a second cohort, and the customized virtual manifest [618] is created for a third cohort. Further, the first cohort, the second cohort and the third cohort are different from each other based on the difference between the segment information of the users of the first, second and third cohort. In an example, the plurality of segments in the customized virtual manifest [602, 610, 618] is referred by reference numbers such as [01], [02], [03], [04], [05], [06], [07], and [08], where each segment is of a uniform length.

The segments referred by the numbers [01], [02], [03], [06], [07], and [08] are the segments associated with the requested streaming content in the customized virtual manifest [602] for the first cohort. The segments referred by the numbers [01], [02], [03], [05], [06], [07], and [08] are the segments associated with the requested streaming content in the customized virtual manifest [610] for the second cohort. The segments referred by the numbers [01], [02], [03], [05B], [06], [07], and [08] are the segments associated with the requested streaming content in the customized virtual manifest [618] for the third cohort.

The segments referred by the numbers [04] and [05] represent the segments associated with the at least one target content in the customized virtual manifest [602] for the first cohort. The segments referred by the numbers [04] represent the segments associated with the at least one target content in the customized virtual manifest [610] for the second cohort. The segments referred by the numbers [04] and [05A] represent the segments associated with the at least one target content in the customized virtual manifest [618] for the third cohort.

As shown in the customized virtual manifest [602] for the first cohort, the second cohort and the third cohort, the first SCTE marker [604, 612, 620] and the second SCTE marker [606, 614, 622] are added by the cloud playout before starting of the [04] and [06] segments respectively based on the current scenario in the live streaming content The first SCTE marker [604, 612, 620] and the second SCTE marker [606, 614, 622] define the relevant places or positions in the requested streaming content where the at least one target content can be served to the user. Based on the position of the SCTE markers, based on user segment information of the first cohort, and based on the available target content campaign for the first cohort, the Content Handling Server [106] identifies the slot [608] optimized and relevant for the insertion of the at least one target content and therefore add the segments associated with the at least one target content in the slot [608] for the delivery of the at least one target content to the user in the requested streaming content. Thus, the length of two segments is used to provide the at least one target content to the users of the first cohort.

Similarly, based on the position of the SCTE markers, based on user segment information of the second cohort, and based on the available target content campaign for the second cohort, the Content Handling Server [106] identifies the slot [616] optimized and relevant for the insertion of the at least one target content and therefore added the segments associated with the at least one target content in the slot [608] for the delivery of the at least one target content to the user in the requested streaming content. Thus, the only length of one segment is used to provide the at least one target content to the users of the second cohort.

Similarly, based on the position of the SCTE markers, based on user segment information of the third cohort, and based on the available target content campaign for the third cohort, the Content Handling Server [106] identifies the slot [624] optimized and relevant for the insertion of the at least one target content and therefore added the segments associated with the at least one target content in the slot [624] for the delivery of the at least one target content to the user in the requested streaming content. Thus, the length of one full segment and one-half (½) segment is used to provide the at least one target content to the users of the third cohort.

Therefore, the time and length of the at least one target content in the requested streaming content varies for each cohort based on the parameters of the cohort, based on the associated target content campaigns, based on the position of SCTE markers and the like. For example, the time to deliver the at least one target content for the first cohort, the second cohort and the third cohort may vary based on likes and dislikes of the respective users of the cohort in watching the replay or review part of a live cricket match, watching the toss, watching the third umpire decisions, watching the batting and/or bowling of players and the like. Further, the segments associated with the requested streaming contents are same and identical in the customized virtual manifest for the first, second and third cohort, while the segments associated with the at least one target content vary as per the cohort and target content campaign.

The present invention also encompasses a non-transient computer-readable medium comprising instructions for causing a computer to perform the method of receiving a request for streaming content from at least one user device [102], wherein the request comprises user segment information associated with the at least one user device [102]; dynamically fetching at least one target content for the at least one user device [102] from the Target Content Server [110] based on the user segment information; creating a customized virtual manifest for the at least one user device [102] by inserting the at least one target content in the requested streaming content in real-time; sending the customized virtual manifest to the at least one user device [102]

based on the user segment information; and delivering the at least one target content in the requested streaming content to the at least one user device [102] based on the customized virtual manifest.

As evident from the above description, the present disclosure provides for a method and system for dynamic optimization and management for the insertion of target content in live media streaming in accordance with exemplary embodiments of the present disclosure. The present disclosure provides for dynamically determining user segments based on certain criterion, and creating a customized virtual manifest for the whole of the user segments, and not just an individual user. Thus, at runtime (i.e., during live streaming) the targeted contents are pushed to all the users in a user segment, thus saving processing time and increasing efficiency of insertion of the target content in live streaming media. It further provides for dynamic and real-time insertion of target content in live streaming media, without any additional delay, so that the target content can be added on the server side directly into the requested stream, and the service provider can directly control the target content it renders.

While considerable emphasis has been placed herein on the disclosed embodiments, it will be appreciated that many embodiments can be made and that many changes can be made to the embodiments without departing from the principles of the present disclosure. These and other changes in the embodiments of the present disclosure will be apparent to those skilled in the art, whereby it is to be understood that the foregoing descriptive matter to be implemented is illustrative and non-limiting.

I claim:

1. A method of real-time delivery of a target content in a streaming content, the method comprising:
   receiving, at a Content Management Server, a request for streaming content from at least one user device, wherein the request comprises user segment information associated with the at least one user device;
   selecting, by a Content Handling Server, at least one cohort from a plurality of cohorts based on the user segment information, wherein cohorts in the plurality of cohorts are associated with a plurality of users;
   dynamically fetching, by the Content Handling Server, at least one target content for the at least one user device from a Target Content Server based on the at least one cohort that is selected;
   creating, by the Content Handling Server, a customized virtual manifest for the at least one user device by inserting the at least one target content in the requested streaming content in real-time;
   sending, by the Content Handling Server, the customized virtual manifest to the at least one user device based on the user segment information; and
   delivering, by a Content Streaming Server, the at least one target content in the requested streaming content to the at least one user device based on the customized virtual manifest.

2. The method as claimed in claim 1, wherein the streaming content corresponds to one of audio content, video content, audio-visual content, and user-interactive content.

3. The method as claimed in claim 1, wherein the streaming content is one of live streaming content and playback content.

4. The method as claimed in claim 1, wherein the target content corresponds to one of audio target content, video target content, or audio-visual target content.

5. The method as claimed in claim 1, further comprises receiving, at the Content Management Server, the user segment information from at least one of a User Management Server, and a Concurrency Service Unit.

6. The method as claimed in claim 1, wherein the request for streaming content is received from the at least one user device at the Content Management server via a media player of the at least one user device via a wired and/or wireless mode.

7. The method as claimed in claim 1, wherein the at least one target content in the requested streaming content is displayed via a media player of the at least one user device.

8. The method as claimed in claim 1, wherein the user segment information comprises demographic information, user profile information, user live location, at least one user interest, at least one user like/preference and at least one user dislike, user interaction pattern with a plurality of target contents in the past, network access by the user on the at least one user device, information associated with the at least one user device.

9. The method as claimed in claim 1, wherein selecting the at least one cohort from the plurality of cohorts comprises:
   identifying, by the Content Handling Server, the at least one cohort associated with the at least one user device based on the analysis and mapping of the user segment information of the at least one user device with user segment information associated with one or more other user devices available in the at least one cohort;
   determining, by the Content Handling Server, the at least one target content to be served to the identified at least one cohort based on the mapping of the one or more first parameters associated with the identified at least one cohort with one or more second parameters associated with at least one of a plurality of target content campaigns.

10. The method as claimed in claim 1, wherein dynamically fetching, by the Content Handling Server, the at least one target content from the Target Content Server is further based on live user concurrency data, target content impressions data, clicks per target content data, wherein the live user concurrency data is received from a Concurrency Service Unit and the target content impressions data and clicks per target content data are received from a Pulse Tracker.

11. The method as claimed in claim 1, further comprises updating, by the Content Handling Server, the customized virtual manifest in a predefined interval of time based on one or more parameters, wherein the one or more parameters comprises change in the user segment information, change in the parameters associated with the fetching of the at least one target content, availability of the at least one new target content campaign, expiry of the existing target content campaign.

12. The method as claimed in claim 1, further comprises receiving, at the Content Handling Server, a response of the at least one user device on the at least one target content, wherein the at least one target content is delivered based on the customized virtual manifest.

13. The method as claimed in claim 12, comprises dynamically updating, by the Content Handling Server, the customized virtual manifest with at least one new target content in an event a negative response or no response is received from the at least one user device.

14. The method as claimed in claim 1, wherein the at least one target content is dynamically fetched in a pre-encoded format that is used for the encoding of the requested streaming content for the creation of the customized virtual manifest and for the delivery of the at least one target content in the requested streaming content.

15. The method as claimed in claim 1 further comprises:
receiving, at the Content Management Server, a request for streaming content from at least one new user device, wherein the request comprises new user segment information associated with the at least one new user device; and
comparing, by the Content Handling Server, the new user segment information with the user segment information received from the at least one user device.

16. The method as claimed in claim 15, further comprises:
sending, by the Content Handling Server, the customized virtual manifest, stored in Content Streaming Server cache, to the at least one new user device in an event the new user segment information matches with the user segment information received from the at least one user device;
delivering, by the Content Streaming Server, the at least one target content in the requested streaming content to the at least one new user device based on the customized virtual manifest.

17. The method as claimed in claim 15, further comprises:
creating, by the Content Handling Server, a new customized virtual manifest in an event the new user segment information does not match with the user segment information received from the at least one user device, wherein the new customized virtual manifest is created based on the new user segment information;
sending, by the Content Handling Server, the new customized virtual manifest to the at least one new user device based on the new user segment information; and
delivering, by the Content Streaming Server, the at least one target content in the requested streaming content to the at least one new user device based on the new customized virtual manifest.

18. The method as claimed in claim 1, wherein insertion of the at least one target content in the requested streaming content for the creation of the customized virtual manifest is performed by inserting one or more Uniform Resource Locators (URLs) associated with the at least one target content with one or more URLs associated with the requested streaming content.

19. A system for real-time delivery of a target content in a streaming content, the system comprising:
a Content Management Server, wherein the Content Management Server is configured to receive a request for streaming content from at least one user device, wherein the request comprises user segment information associated with the at least one user device;
a Content Handling Server, wherein the Content Handling Server is connected with the Content Management Server, wherein the Content Handling Server is configured to:
select at least one cohort from a plurality of cohorts based on the user segment information, wherein cohorts in the plurality of cohorts are associated with a plurality of users;
dynamically fetch at least one target content for the at least one user device from a Target Content Server based on the at least one cohort that is selected;
create a customized virtual manifest for the at least one user device by inserting the at least one target content in the requested streaming content in real-time;
send the customized virtual manifest to the at least one user device based on the user segment information; and
a Content Streaming Server, wherein the Content Streaming Server is connected with the Content Management Server and the Content Handling Server, wherein the Content Streaming Server is configured to deliver the at least one target content in the requested streaming content to the at least one user device based on the customized virtual manifest.

20. A non-transient computer-readable medium comprising instructions for causing a computer to perform the method of:
receiving a request for streaming content from at least one user device, wherein the request comprises user segment information associated with the at least one user device;
selecting at least one cohort from a plurality of cohorts based on the user segment information, wherein cohorts in the plurality of cohorts are associated with a plurality of users;
dynamically fetching at least one target content for the at least one user device from a Target Content Server based on the at least one cohort;
creating a customized virtual manifest for the at least one user device by inserting the at least one target content in the requested streaming content in real-time;
sending the customized virtual manifest to the at least one user device based on the user segment information; and
delivering the at least one target content in the requested streaming content to the at least one user device based on the customized virtual manifest.

* * * * *